United States Patent [19]

Gramling

[11] Patent Number: 5,090,267

[45] Date of Patent: Feb. 25, 1992

[54] INDEXING APPARATUS

[76] Inventor: James T. Gramling, 1578 N. Hunter, Olathe, Kans. 66062

[21] Appl. No.: 616,884

[22] Filed: Nov. 21, 1990

[51] Int. Cl.$^5$ .......................... F16H 1/16; F16H 55/18; B23B 29/24

[52] U.S. Cl. ...................... 74/427; 74/409; 74/813 L

[58] Field of Search ............ 74/409, 427, 665 C, 74/813 L

[56] References Cited

U.S. PATENT DOCUMENTS

| 645,463 | 3/1900 | Diffenderffer | 74/427 |
| 3,847,032 | 11/1974 | Moser | 74/427 |
| 4,091,686 | 5/1978 | Seitz | 74/409 |

FOREIGN PATENT DOCUMENTS

| 544319 | 7/1957 | Canada | 74/427 |
| 2-51640 | 2/1990 | Japan | 74/427 |

Primary Examiner—Allan D. Herrmann
Assistant Examiner—David W. Laub
Attorney, Agent, or Firm—Hovey, Williams, Timmons & Collins

[57] ABSTRACT

An indexing mechanism includes an index output shaft connected to a table or other apparatus for rotation therewith. A pinion is operatively connected to the shaft for rotation therewith to transmit rotational force to the table or apparatus. The pinion is rotated to a preset angular position by first and second drive gears, each of which are in engagement with the pinion. At least one motor is provided for carrying out rotation of the drive gears. One of the drive gears is rotated relative to the other gear in a predetermined direction into engagement with the pinion and rotates the pinion, if necessary, into contact with the other drive gear so that backlash is removed from the apparatus. This biasing action is a result of a phase shift carried out between the first and second drive gears such that one of the gears is rotated relative to the other drive gear. A particular phase shift apparatus adapted for use with the index table or apparatus is also disclosed.

8 Claims, 5 Drawing Sheets

INDEXING APPARATUS

BACKGROUND OF THE INVENTION

1. Field of the Invention

The present invention relates generally to gear trains having anti-backlash devices and, more particularly, to an index table apparatus having a gear drive assembly for rotating the table to a desired angular position, wherein the gear drive assembly includes a duality of driving members having between them a phase shift apparatus for removing backlash within the gear train.

2. Discussion of the Prior Art

It is known to provide an index table for use in supporting a workpiece and for rotating the workpiece to various preset angular positions at which assorted operations are carried out. For example, indexing tables are used in the manufacture of machine tools, and are operable to reposition a tool during machining operations so that a number of such operations may be conducted without removing the tool from the table. In such indexing tables, rotary motion is provided either manually, or automatically as in the case of a numerically controlled device.

Where rotary motion of an indexing table is carried out automatically, it is conventional to provide a motor and a gear drive assembly for transmitting rotational movement of the motor to the table in a manner capable of being measured and controlled. For example, it is possible to transmit rotational movement of a DC servomotor to an indexing table via a gear train and to stop and lock the indexing table at a preset angular position by actuating an air brake or the like provided on the device when the desired position is reached.

A number of drawbacks are present in a device of this known type. For example, although air brakes and the like reliably stop an indexing gear and retain the gear in a locked position, such devices fail to accurately locate the indexing gear consistently for one braking operation after another. This lack of consistency is due in part to the failure of such braking devices to repeatedly accommodate backlash in a predictable manner so as to remove the effects of such backlash on the indexing operation.

Apart from the use of known indexing mechanisms and index tables, it is also conventional to provide gear drive devices in certain nonrelated apparatuses, wherein the gear drives include anti-backlash mechanisms for reducing the effects of backlash between the gears of the drive. Such anti-backlash mechanisms are known to employ spring biasing means for biasing one or more gears into contact with adjacent gears such that backlash is reduced. However, in these conventional devices, if a rotational force greater than the force of the spring biasing means is exerted on the biased gear in a direction opposite to that of the biasing means, movement between the gears occurs and the problems inherent with backlash recur.

OBJECTS AND SUMMARY OF THE INVENTION

It is an object of the present invention to provide an index table having an automatic drive system incorporating an anti-backlash gear drive assembly which eliminates the adverse effects of backlash during positioning of the index table. In addition, it is another object of the present invention to provide such a drive assembly having improved accuracy relative to known constructions in order that reliable positioning of the index table is possible.

In accordance with these and other objects of the present invention, an index table apparatus comprises an index table, a shaft connected to the table, and a pinion operatively connected to the shaft for rotation therewith. Positioning means are provided for rotating the pinion to a preset angular position, the positioning means including first and second drive gears each in engagement with the pinion, and drive means for rotating the drive gears. Also, the apparatus includes biasing means for biasing one of the drive gears in a predetermined direction into engagement with the pinion and for urging the pinion into contact with the other of the drive gears so as to remove backlash from the apparatus. The biasing means includes phase shift means for changing the phase relationship between the first and second drive gears such that the biased drive gear is rotated relative to the other drive gear.

According to another aspect of the present invention, a phase shift apparatus is provided for use between first and second rotation-transmitting gears. The phase shift apparatus includes, among other features, transmission means for transmitting rotational movement of the first gear to the second gear. The transmission means is provided with a first gearwheel mounted on a first shaft for rotation therewith and a second gearwheel mounted on the first shaft for independent rotation relative to the first gearwheel and the first shaft. A gearwheel mounting arm is supported on the first shaft for pivotal movement about an axis concentric with the first shaft and at least two transmission gearwheels are supported on the mounting arm for transmitting rotation of the first gearwheel to the second gearwheel. The apparatus also includes means for transmitting rotation of the second gearwheel to a second shaft supporting the second output gear and means for pivoting the mounting arm thereby shifting the phase relationship between the first and second gearwheels and the first and second rotation-transmitting gears.

BRIEF DESCRIPTION OF THE DRAWING FIGURES

A preferred embodiment of the present invention is described in detail below with reference to the attached drawing figures, wherein.

DETAILED DESCRIPTION OF THE PREFERRED EMBODIMENT

Figure 6:
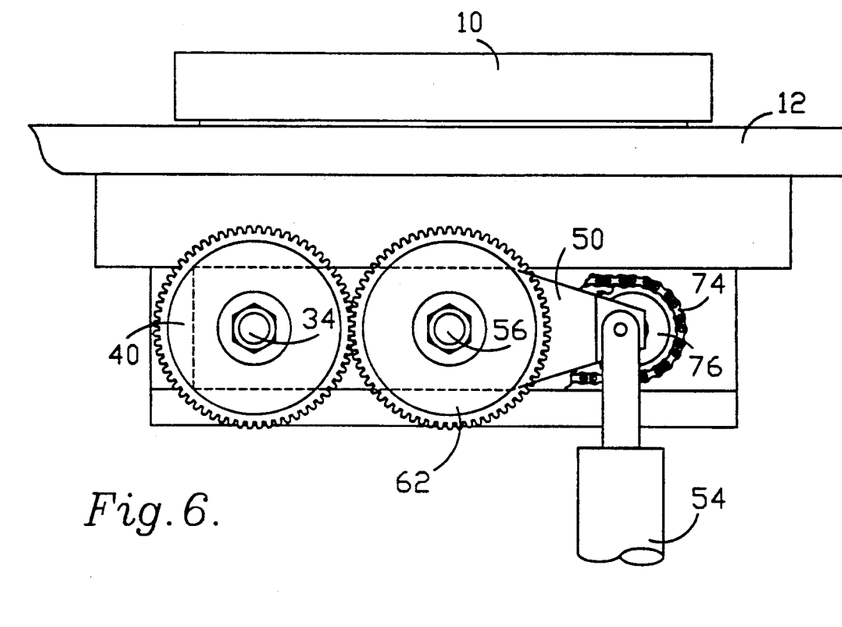
FIG. 6 is a side elevational view of an index table apparatus constructed in accordance with the preferred embodiment of the invention.

An index table apparatus constructed in accordance with a preferred embodiment of the invention is illustrated in FIG. 6, and includes an index table 10 supported on a frame 12 for rotatable movement relative thereto.

Although a horizontal table is illustrated in the figures, the invention also finds utility with vertical and/or tilting tables, and the table may be of any desired shape or size. Further, the index table apparatus may be used in any type of programmable indexing system such as an automatic indexing table designed for use on machine tools for production machining operations. Other types of devices in which the inventive table finds application are tube bending and plate rod devices of known construction.

Figure 8:
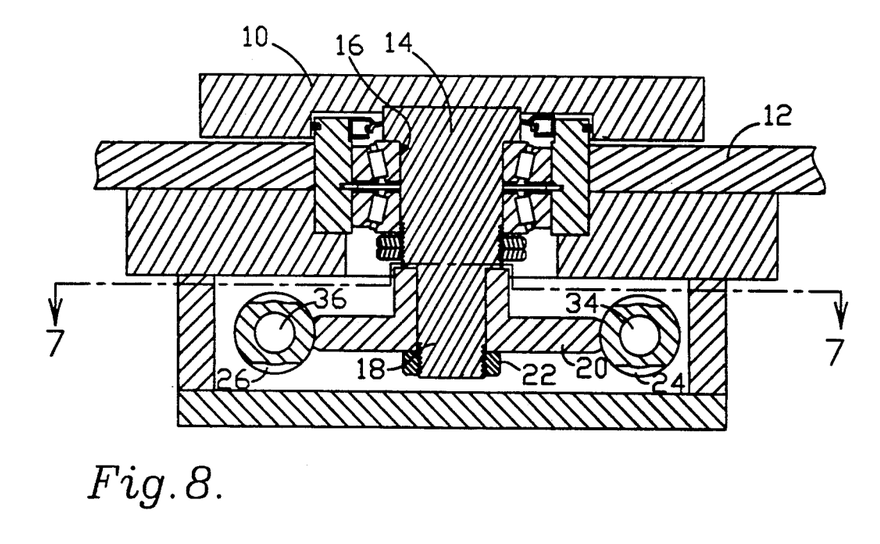
FIG. 8 is a side sectional view of the gear drive assembly taken along line 8—8 of FIG. 7.

As illustrated in FIG. 8, the index table 10 includes a drive shaft 14 extending vertically from the bottom surface of the table through the frame 12. A suitable bearing assembly 16 is provided between the frame 12 and the shaft 14 to support the table 10 and shaft for rotation relative to the frame and the shaft 14 is provided with a section 18 of reduced diameter on which a pinion 20 is supported for rotation therewith. For example, the pinion 20 may be received on the section 18 and retained on the shaft by a nut 22 received on a threaded portion of the shaft.

Figure 1:
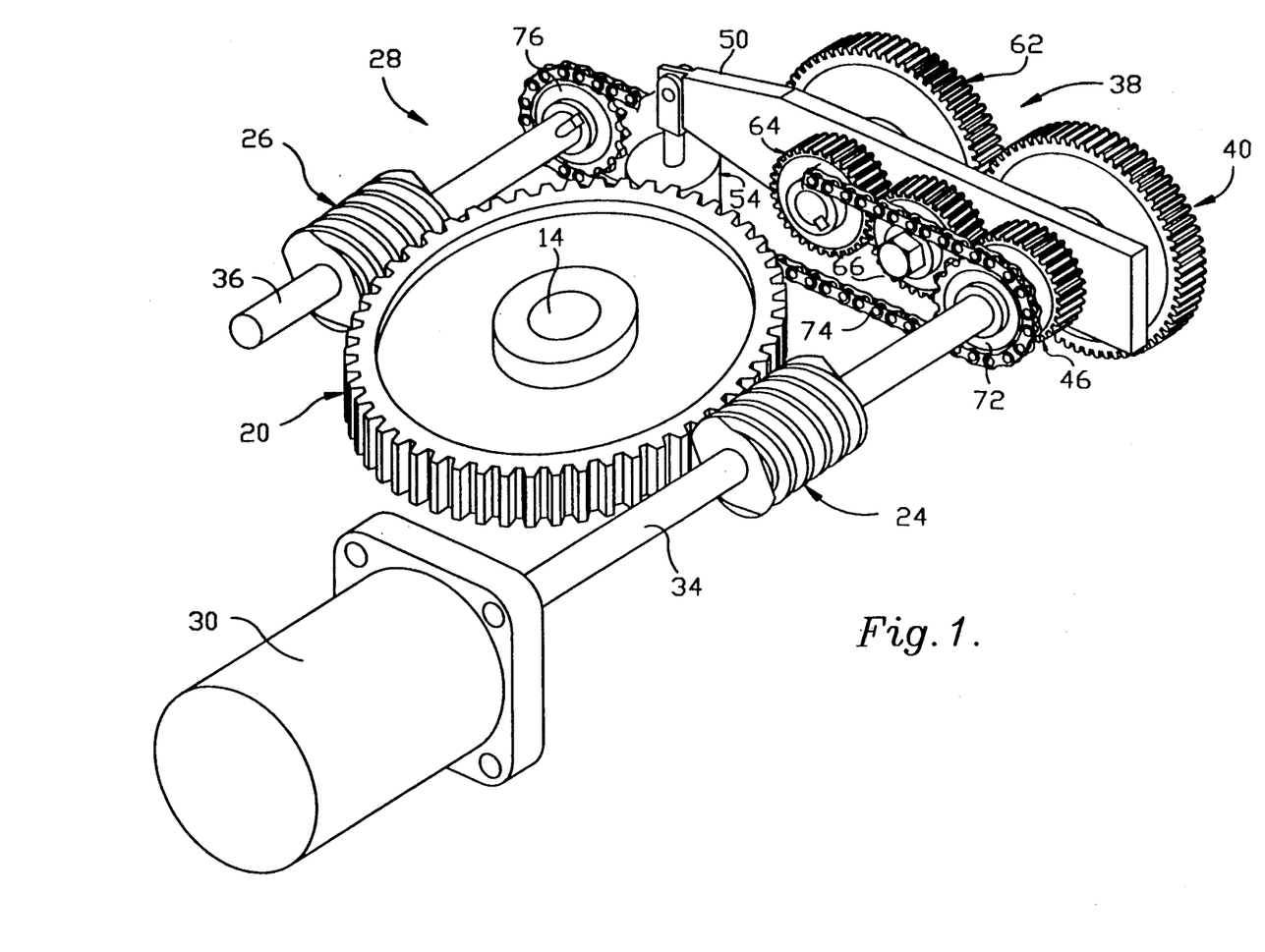
FIG. 1 is a perspective view of an index table gear drive assembly constructed in accordance with a preferred embodiment of the invention.

The pinion 20 is disposed between a pair of worm gears 24, 26 which form a part of a gear drive assembly 28 used to rotate the pinion and the index table 10 to any desired preset angular position relative to the frame 12 The gear drive assembly 28 is shown in FIG. 1, and includes, in addition to the two worm gears 24, 26, a drive motor 30 having an output shaft 32, a first drive shaft 34 connected to the output shaft and supporting the first worm gear for rotation therewith, a second drive shaft 36 extending in a direction parallel to the first drive shaft and supporting the second worm gear 26 for rotation therewith, and a transmission assembly 38 for transmitting rotation of the first shaft to the second shaft in such a way that the two worm gears rotate cooperatively in opposite directions to rotate the pinion.

The drive motor 30 is preferably a servomotor or stepper motor capable of rotating the first drive shaft 34 to any desired angular position and stopping the drive shaft accurately at that position. Thus, the first worm gear 24 is driven to accurately locate the pinion 20 in any desired angular position by controlling the rotation of the drive motor 30.

Figure 4:
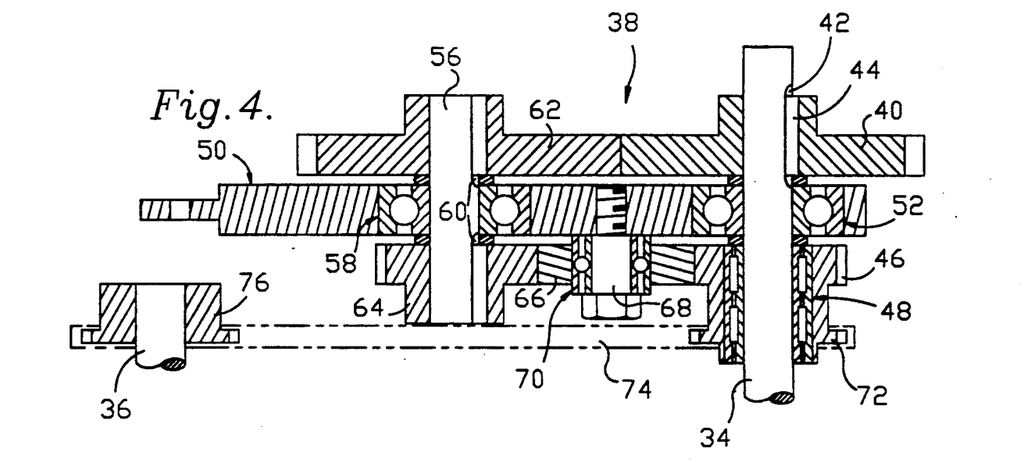
FIG. 4 is a top sectional view of the mounting arm and of the rotation-transmitting gears employed in the gear drive assembly.

The transmission assembly 38 includes a first gearwheel 40 which is fixed to an end of the first shaft 34 opposite the drive motor 30. As shown in FIG. 4, a spline 42 is formed in the first shaft 34 and a key 44 is disposed within the spline between the first gearwheel 40 and the shaft 34 to prevent relative rotation therebetween. A second gearwheel 46 is supported by a bearing assembly 48 on the first drive shaft 34 for independent rotation relative to the first gearwheel 40 and the first shaft 34.

An elongated mounting arm 50 is supported on the first shaft 34 by a bearing assembly 52 and is pivotable about the axis of the first drive shaft 34 between a home position and an acutated position. The mounting arm 50 is disposed axially along the first drive shaft 34 at a position intermediate the first and second gearwheels 40, 46. A lifting means 54 is provided on the mounting arm 50 at an end thereof remote from the first shaft 34, and preferably includes a DC solenoid or other available actuating means for moving the mounting arm between the home and actuted positions.

A transmission shaft 56 is supported by a bearing assembly 58 on the mounting arm 50 for rotation about an axis extending in a direction generally transverse to the direction in which the mounting arm extends and parallel to the first and second drive shafts 34, 36. The transmission shaft 56 includes a spline 60 at each axially end thereof for permitting a pair of transmission gears 62, 64 to be affixed to the shaft for rotation therewith. The first of these intermediate gears 34 is disposed on the same side of the mounting arm 50 as the first gearwheel 40 and engages the first gearwheel such that rotation of the first gearwheel is transmitted to the transmission shaft 56. A third transmission gear 66 is retained on the mounting arm 50 by a pin 68 having a bearing assembly 70 for permitting rotation of the third gear relative to the mounting arm. The third transmission gear 66 is disposed to the same side of the mounting arm 50 as the second transmission gear 64 and the second gearwheel 46, and engages each of these gears such that rotation of the transmission shaft is transferred from the second transmission gear 64 to the second gearwheel 46 via the third transmission gear 66. Thus, when the first drive shaft 34 is rotated in a given direction by the motor 30, the first gearwheel 40 will rotate in the same given direction while the second gearwheel 46 will rotate in the opposite direction.

A sprocket wheel 72 is either connected to or is formed as a part of the second gearwheel 46 and rotates with the second gearwheel so as to transmit rotational movement thereof to a chain 74 trained around the sprocket wheel. This chain 74 is also trained around a second sprocket wheel 76 which is supported via a splined connection or the like on the second drive shaft 36 such that rotational movement of the first sprocket wheel 72 is transmitted to the second sprocket wheel 76 and thus to the second drive shaft 36. In this manner, whenever the drive motor 30 rotates the first drive shaft 34 in a given direction, the second drive shaft 36 is rotated in the opposite direction so that the two worm gears 24, 26 cooperate to turn the pinion 20.

Figure 7:
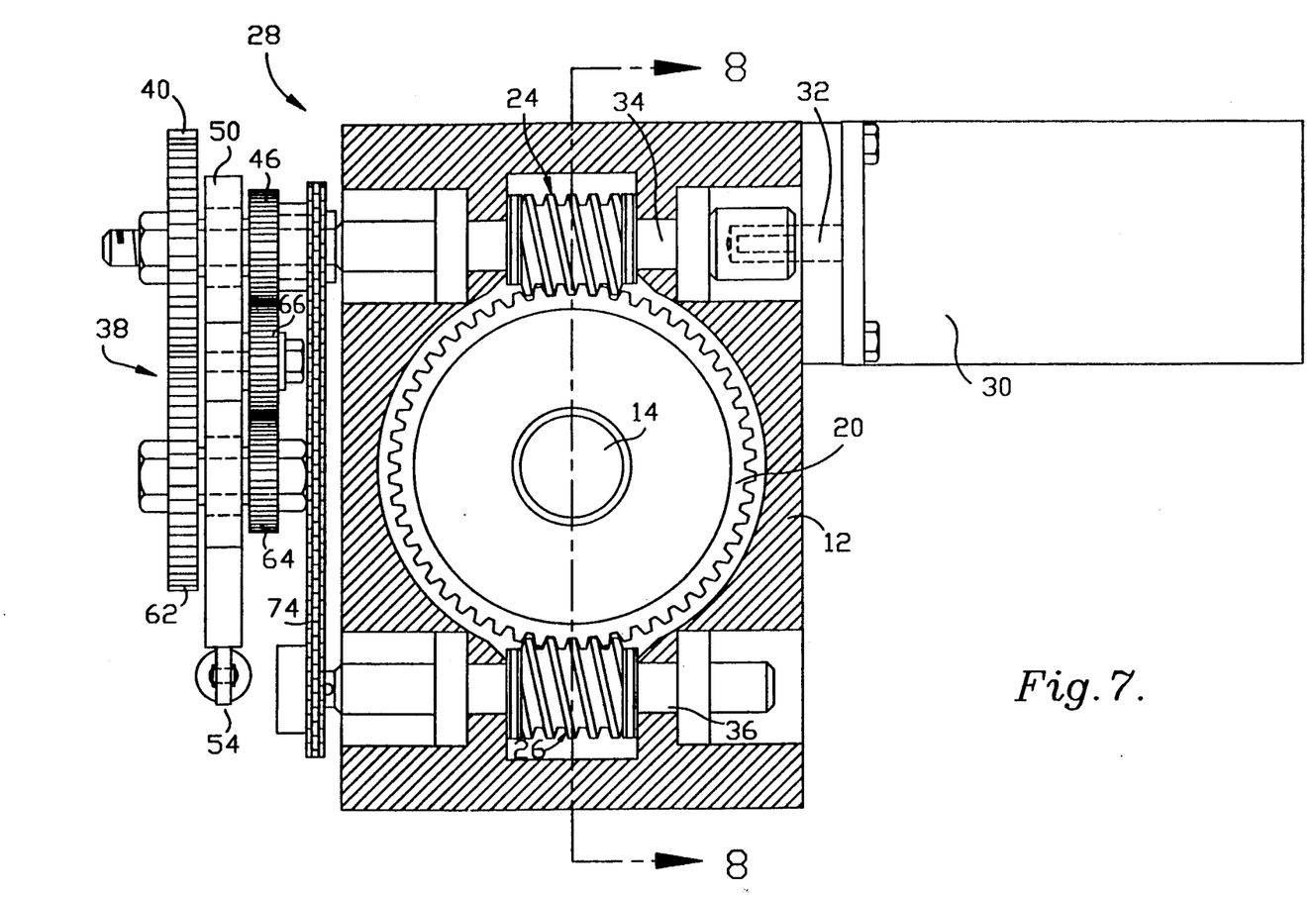
FIG. 7 is a top sectional view of the gear drive assembly taken along line 7—7 of FIG. 8.

Numerous advantageous results are achieved through the use of the disclosed gear drive assembly 28. For example, the use of a pair of worm gears for rotating the pinion 20 to a desired indexing position provides a limited locking function in that, although rotation of the pinion is carried out easily by turning the worm gears, it is difficult to rotate the worm gears by turning the pinion. This mechanical advantage of the worm gear arrangement resides in the orientation of the teeth of the worm gears which extend in a direction generally transverse to the rotational axes thereof such that a very large driving force by the pinion would be required to turn the worm gears. Further, by employing two worm gears located on opposite sides of the pinion, as shown in FIG. 7, which together position the pinion 20, movement of the pinion is inhibited by the worm gears once the pinion has been rotated to a desired position.

Figure 5:
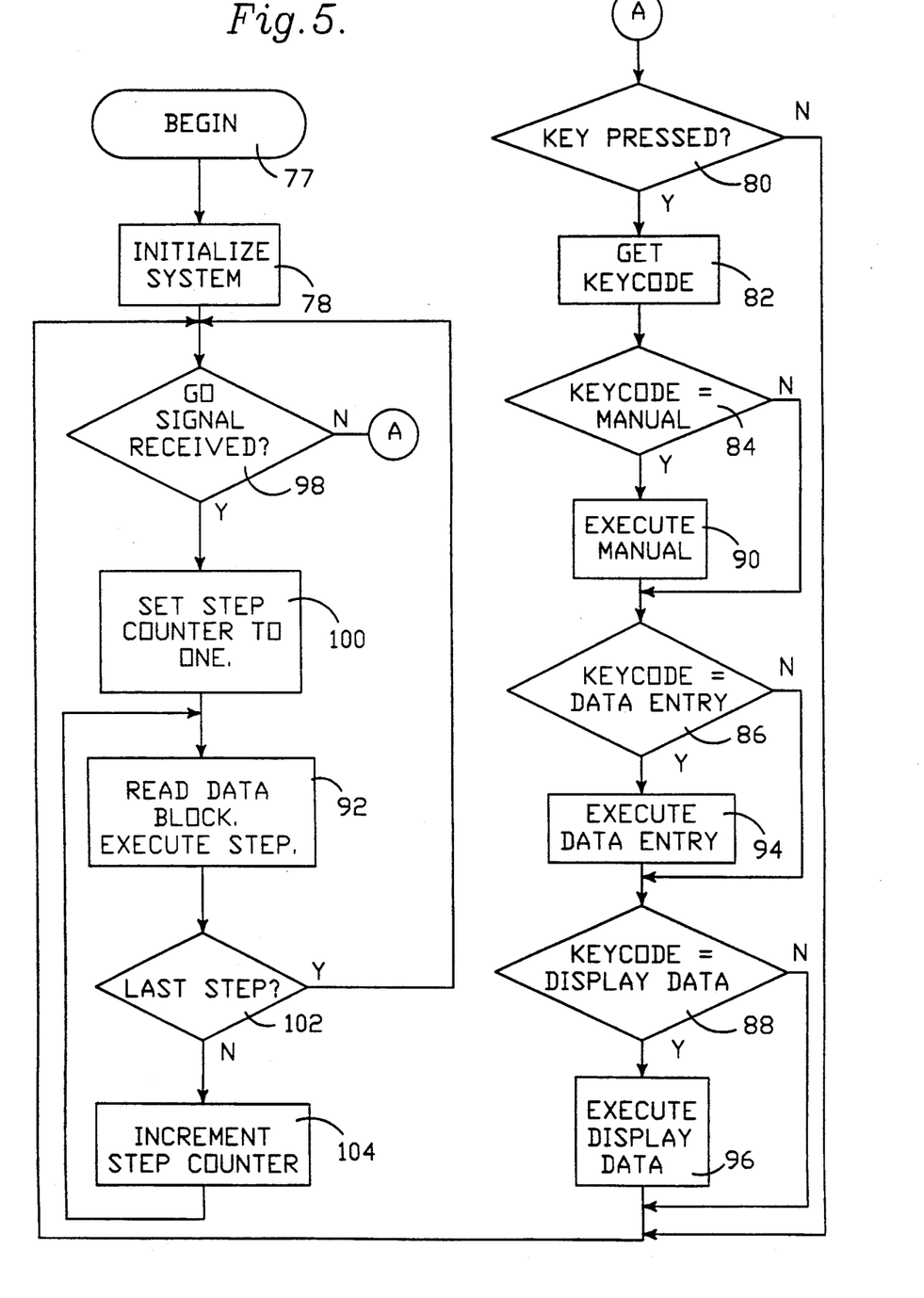
FIG. 5 is a schematic flow diagram illustrating a preferred method for controlling operation of an index table.

An exemplary control system for controlling operation of an index table constructed in accordance with the preferred embodiment is shown in FIG. 5. Upon start-up of the system in step 77, an initialization step 78 is carried out prior to entering a control loop including a number of keycode entry and operational steps. Initially, in step 80 the system determines whether any key on a keypad, not shown, has been pressed and, if so, goes to step 82 which determines which key has been pressed. Three different types of keycode entry are possible and are analyzed in steps 84, 86, 88. If a manual operation, such as clamping or unclamping of a workpiece from the index table is to be carried out during operation of the index table, a key associated with this function is pressed which is identified in step 84 causing a go signal to be produced in step 90 which permits execution of this operation to be carried out in step 92 as discussed more fully below. Other types of manual operations which may be carried out in this manner include jogging, stepping or indexing the table, and each of these operations may be provided with a separate key on the keypad.

The second type of keycode entry includes the entry of blocks of data representative of various parameters relevant to the indexing operation. For example, it is possible to enter into the keypad various desired orientation positions of the index table or various operations to be carried out on the workpiece at a preset position. This type of keycode entry is analyzed in step 86 and is entered into the control system in step 94. Finally, in order to display information on a screen provided on the keypad, any of various available display keys may be pressed which are recognized in step 88 and executed in step 96 to display the desired information.

In step 98, it is determined whether a go signal has been generated. If so, a step counter is set to one in step 100 and a first data block stored in a memory of the control system is read and executed in step 92, such that the programmed operation is carried out on the index table. If further steps are included, as determined in step 102, then the control system increments the step counter in step 104 and reads and executes the next data block until the last step is carried out. Thereafter, the system awaits receipt of a further go signal prior to carrying out further operations on the index table.

If the operation selected by the control system is an indexing operation, then the system causes the drive motor 30 to rotate in a direction and by an amount sufficient to rotate the pinion 20 to the desired angular orientation. For example, if the pinion 20 is to be rotated in a clockwise direction as shown in FIG. 1, the motor 30 rotates the first drive shaft 34 in a clockwise direction so that the first worm gear 24 rotates the pinion. Further, the clockwise rotation of the first drive shaft 34 is transmitted through the first gearwheel 40 and the three transmission gears 62, 64, 66 to the second gearwheel 46 such that the second gearwheel rotates in a direction opposite to that of the first drive shaft 34. This counter clockwise rotation of the second gearwheel 46 is transmitted via the chain 74 to the second drive shaft 36 such that the second worm gear 26 is also rotated in a counter clockwise direction opposite to that of the first worm gear 24. Because the worm gears 24, 26 are disposed on opposite sides of the pinion 20, the counter clockwise rotation of the second worm gear 26 cooperates with the clockwise rotation of the first worm gear 24 to drive the pinion 20 in a clockwise direction. Thus, the two worm gears operate together to carry out rotation of the pinion.

Figure 2:
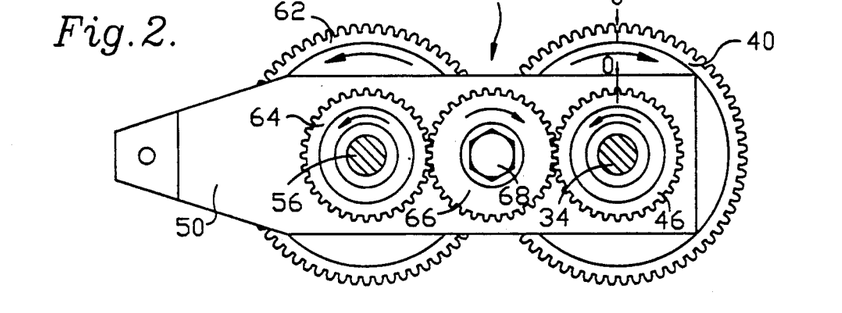
FIG. 2 is a schematic side elevational view of a mounting arm of the gear drive assembly and of a number of rotation-transmitting gears employed in the assembly, wherein the mounting arm is shown in a home position.

During this indexing operation, the mounting arm 50 is disposed in the home position which is shown in FIG. 6, wherein the gears 62, 64, 66 of the transmission assembly 38 are in phase with one another such that the two worm gears 24, 26 drive the pinion 20 with substantially the same force. The phase relationship between the first and second gearwheels 40, 46, when the mounting arm 50 is in this home position, is illustrated in FIG. 2. As can be seen from a review of this figure, a reference point 0 on the first gearwheel 40 is aligned with a reference point 0 on the mounting arm 50 and the second gearwheel 46.

Figure 3:
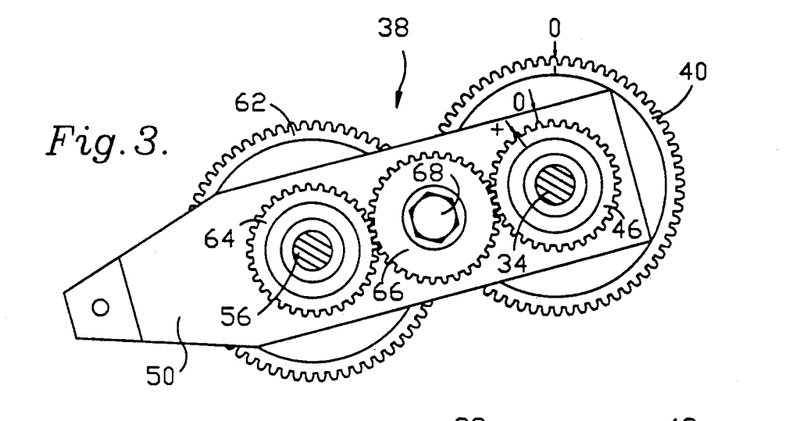
FIG. 3 is a schematic side elevational view of a mounting arm of the gear drive assembly and of a number of rotation-transmitting gears employed in the assembly, wherein the mounting arm is shown in actuated position.

Once indexing of the pinion 20 is complete the motor 30 stops rotation of the first shaft 34 causing the first and second worm gears 24, 26 to be substantially locked against further rotation. However, an additional phase shifting operation is carried out on the second worm gear 26 in order to remove backlash between the pinion 20 and the two worm gears 24, 26. This phase shifting operation includes the step of actuating the lifting means 54 to move the mounting arm 50 from the home position shown in FIG. 2, to the actuated position illustrated in FIG. 3. When the mounting arm 50 is pivoted in this manner, the reference point 0 on the first gearwheel remains stationary since the first gearwheel is affixed to the first drive shaft 34. However, the reference point 0 on the second gearwheel 46 is shifted in a counter clockwise direction by an amount dictated by the rotation of the transmission gears 62, 64, 66 relative to the first gearwheel 40.

The phase shift carried out between the first and second gearwheels 40, 46 is transmitted to the second worm gear 26 by the chain 74 and sprocket wheels 72, 76, and causes the second worm gear 26 to rotate relative to both the pinion 20 and the first worm gear 24 such that the second worm gear turns the pinion by an amount sufficient to cause the teeth of the pinion to press against the teeth of both the first and second worm gears. Thus, the pinion 20 is substantially locked against further rotational movement until such time as the mounting arm 50 is moved back to its home position such that the second worm gear 26 is rotated back into phase with the first worm gear 24.

Because the phase shifting operation is always carried out in the same direction regardless of the direction in which the worm gears 24, 26 rotate during any particular indexing operation, the pinion 20 is always biased in the same direction against the teeth of the first worm gear 24. This consistent positioning of the pinion 20 permits repeated, accurate indexing of the table at any desired angular position while removing the adverse effects of backlash within the apparatus. Further, this increased accuracy permits the indexing apparatus to be used in applications requiring greater precision than is provided by conventional indexing devices.

Although the invention has been described with reference to the illustrated preferred embodiment, it is noted that improvements may be made and equivalents employed herein without departing from the scope of the invention as recited in the claims.

What is claimed is:

1. An index table apparatus comprising:
   an index table having an axis about which the table is rotatable;

a shaft connected to the table and including a shaft axis coaxial with the axis of the table;

a pinion operatively connected to the shaft for rotation therewith and including a plurality of teeth;

positioning means for rotating the pinion to a preset angular position, the positioning means including first and second drive gears each including a plurality of teeth and being in driving engagement with the pinion, and drive means for rotating the drive gears;

phase shift means for changing the phase relationship between the first and second drive gears for removing backlash between the pinion and the first and second drive gears, the phase shift means including moving means for moving the second drive gear between a home position in which the first and second drive gears are in phase with one another and an actuated position in which the first and second drive gears are out of phase with one another; and actuating means for actuating the phase shift means after operation of the positioning means to move the second drive gear to the actuated position and for deactuating the phase shift means during operation of the positioning means to move the second drive gear to the home position.

2. The apparatus as recited in claim 1, wherein the first and second drive gears are worm gears.

3. The apparatus as recited in claim 1, wherein the drive means for rotating the drive gears includes a motor for rotating the first drive gear and transmission means for transmitting rotation of the first drive gear to the second drive gear.

4. An index table apparatus comprising:

an index table having an axis about which the table is rotatable;

a shaft connected to the table and including a shaft axis coaxial with the axis of the table;

a pinion operatively connected to the shaft for rotation therewith;

positioning means for rotating the pinion to a preset angular position, the positioning means including first and second drive gears each in engagement with the pinion, and drive means for rotating the drive gears, the drive means including a motor for rotating the first drive gear and transmission means for transmitting rotation of the first drive gear to the second drive gear; and biasing means for biasing one of the drive gears in a predetermined direction into engagement with the pinion and fur urging the pinion into engagement with the other of the drive gears so as to remove backlash from the apparatus, the biasing means including phase shift means for changing the phase relationship between the first and second drive gears such that the biased drive gear is rotated relative to the other drive gear the transmission means including a first shaft for supporting the first drive gear, a second shaft for supporting the second drive gear, a first gearwheel mounted on the first shaft for rotation therewith, a second gearwheel mounted on the first shaft for independent rotation relative to the first shaft, a mounting arm supported on the first shaft for pivotal movement about an axis concentric with the first shaft, at least two transmission gearwheels supported on the mounting arm for transmitting rotation of the first gearwheel to the second gearwheel, and means for transmitting rotation of the second gearwheel to the second shaft.

5. The apparatus as recited in claim 4, wherein the biasing means includes means for pivoting the mounting arm thereby shifting the phase relationship between the first and second gearwheels and the first and second drive gears.

6. An anti-backlash gear drive assembly comprising:

a first worm gear;

drive means for rotating the first worm gear to carry out an indexing operation;

a second worm gear;

transmission means for transmitting rotation of the first worm gear to the second worm gear;

an output gear in engagement with both the first and second worm gears and adapted to be driven by the first and second worm gars during the indexing operation;

phase shift means for changing the phase relationship between the first and second worm gears for removing backlash between the output gear and the first and second worm gears, the phase shift means including moving means for moving the second worm gear between a home position in which the first and second worm gears are in phase with one another and an actuated position in which the first and second worm gears are out of phase with one another; and actuating means for actuating the phase shift means after an indexing operation to move the second worm gear to the actuated position and for deactuating the phase shift means during an indexing operation to move the second worm gear to the home position.

7. An anti-backlash gear drive assembly comprising:

a first worm gear;

drive means for rotating the first worm gear to carry out an indexing operation;

a second worm gear;

transmission means for transmitting rotation of the first worm gear to the second worm gear;

an output gear in engagement with both the first and second worm gears and adapted to be driven by the first and second worm gears during the indexing operation; and biasing means for rotating one of the worm gears relative to the other worm gear in a predetermined direction into contact with the output gear and for urging the output gear into contact with the other worm gear to remove backlash between the output gear and the first and second worm gears when rotation of the indexing operation is completed, wherein the transmission means includes, a first shaft for supporting the first worm gear, a second shaft for supporting the second worm gear, a first gearwheel mounted on the first shaft for rotation therewith, a second gearwheel mounted on the first shaft for independent rotation relative to the first shaft, a mounting arm supported on the first shaft for pivotal movement about an axis concentric with the first shaft, at least two transmission gearwheels supported on the mounting arm for transmitting rotation of the first gearwheel to the second gearwheel, and means for transmitting rotation of the second gearwheel to the second shaft.

8. A phase shift apparatus for use between first and second rotation-transmitting gears, the phase shift apparatus comprising:
   a first shaft for supporting the first gear;
   a second shaft for supporting the second gear;
   transmission means for transmitting rotational movement of the first gear to the second gear, the transmission means including,
      a first gearwheel mounted on the first shaft for rotation therewith,
      a second gearwheel mounted on the first shaft for independent rotation relative to the first gearwheel and the first shaft,
      a gearwheel mounting arm supported on the first shaft for pivotal movement about an axis concentric with the first shaft,
      at least two intermediate gearwheels supported on the mounting arm for transmitting rotation of the first gearwheel to the second gearwheel, and
      means for transmitting rotation of the second gearwheel to the second shaft; and
   means for pivoting the mounting arm thereby shifting the phase relationship between the first and second gearwheels and the first and second output gears.

* * * * *